United States Patent
Rangadass et al.

(10) Patent No.: US 8,689,008 B2
(45) Date of Patent: Apr. 1, 2014

(54) OPERATING SYSTEM

(75) Inventors: Vasu Rangadass, Arlington, TX (US); Ravi Seshadri, Plano, TX (US)

(73) Assignee: NET.ORANGE, Inc., Dallas, TX (US)

(*) Notice: Subject to any disclaimer, the term of this patent is extended or adjusted under 35 U.S.C. 154(b) by 861 days.

(21) Appl. No.: 12/536,060

(22) Filed: Aug. 5, 2009

(65) Prior Publication Data

US 2010/0037067 A1 Feb. 11, 2010

Related U.S. Application Data

(60) Provisional application No. 61/086,344, filed on Aug. 5, 2008.

(51) Int. Cl.
*G06F 12/14* (2006.01)

(52) U.S. Cl.
USPC .......... 713/189; 713/167; 713/193; 713/155; 726/4; 726/27; 705/2

(58) Field of Classification Search
USPC ......... 713/182–189, 193; 705/2, 3; 726/2, 27; 380/59
See application file for complete search history.

(56) References Cited

U.S. PATENT DOCUMENTS

| | | | |
|---|---|---|---|
| 5,790,120 A | 8/1998 | Lozares et al. | |
| 7,039,878 B2 | 5/2006 | Auer et al. | |
| 7,286,997 B2* | 10/2007 | Spector et al. | 705/2 |
| 7,627,617 B2* | 12/2009 | Kavuri et al. | 1/1 |
| 7,669,114 B2* | 2/2010 | Wood | 715/205 |
| 7,774,388 B1* | 8/2010 | Runchey | 707/811 |
| 7,831,450 B2 | 11/2010 | Schoenberg et al. | |
| 7,886,156 B2* | 2/2011 | Franchi | 713/186 |
| 7,987,497 B1* | 7/2011 | Giles et al. | 726/2 |
| 8,000,977 B2* | 8/2011 | Achan | 705/2 |
| 8,135,956 B2* | 3/2012 | Balfanz | 713/186 |
| 8,150,710 B2* | 4/2012 | Iwano et al. | 705/3 |
| 2002/0183044 A1 | 12/2002 | Blackwell et al. | |
| 2005/0027995 A1* | 2/2005 | Menschik et al. | 713/193 |
| 2006/0143562 A1* | 6/2006 | Seurig et al. | 715/513 |
| 2006/0150107 A1* | 7/2006 | Leung et al. | 715/745 |
| 2006/0155584 A1* | 7/2006 | Aggarwal | 705/3 |
| 2006/0184524 A1* | 8/2006 | Pollanz | 707/6 |
| 2006/0287890 A1* | 12/2006 | Stead et al. | 705/3 |
| 2007/0198437 A1* | 8/2007 | Eisner et al. | 705/79 |
| 2007/0250913 A1* | 10/2007 | Betz et al. | 726/4 |
| 2008/0072064 A1* | 3/2008 | Franchi | 713/186 |
| 2008/0097918 A1* | 4/2008 | Spector et al. | 705/51 |
| 2008/0288286 A1 | 11/2008 | Noreen et al. | |
| 2009/0019552 A1* | 1/2009 | McLaughlin et al. | 726/27 |
| 2009/0036750 A1* | 2/2009 | Weinstein et al. | 600/300 |
| 2009/0327714 A1* | 12/2009 | Yaghmour | 713/168 |

(Continued)

OTHER PUBLICATIONS

Weaver AC, Enforcing Distributed data security via web services, Sep. 2004, IEEE, vol. 6, pp.-397-402.*

(Continued)

*Primary Examiner* — Cordelia Zecher
*Assistant Examiner* — Viral Lakhia
(74) *Attorney, Agent, or Firm* — Patent Capital Group

(57) ABSTRACT

A new and improved operating system comprising a series of self-contained interconnected modules and service layers for connecting proprietary systems together and extracting and translating data therefrom enables existing software systems to operate and cooperate in an existing software ecosystem while allowing flexible connections with both existing and new applications.

20 Claims, 11 Drawing Sheets

(56) References Cited

U.S. PATENT DOCUMENTS

| | | | |
|---|---|---|---|
| 2010/0049547 | A1 | 2/2010 | Mirza et al. |
| 2011/0313787 | A1 | 12/2011 | Rangadass et al. |
| 2013/0006649 | A1 | 1/2013 | Rangadass et al. |
| 2013/0054272 | A1 | 2/2013 | Rangadass et al. |
| 2013/0144653 | A1 | 6/2013 | Poe et al. |
| 2013/0166317 | A1 | 6/2013 | Beardall et al. |

OTHER PUBLICATIONS

Lipkus, et al., "The Visual Communication of Risk", Journal of the National Cancer Institute Monographs, No. 25, 1999 (15 pages).

Ancker, et al. "Design Features of Graphs in Health Risk Communication: A Systematic Review," J Am Med Inform Assoc., 13:608-618; 2006 (11 pages).

Zikmund-Fisher, et al., "Cool but Counterproductive: Interactive, Web-Based Risk Communications can Backfire," J Med Internet Res. 2011, Jul.-Sep.; (13(3): e60; Aug. 25, 2011.

Gadhia, et al., "Assessment and Improvement of Figures to Visually Convey Benefit and Risk of Stroke Thrombolysis," NIH Public Access, Author Manuscript, Stroke, 41(2): 300-306; Feb. 2010 (13 pages).

Non-Final Office Action in U.S. Appl. No. 12/816,804 mailed on Feb. 9, 2012.

Response to Non-Final Office Action dated Feb. 9, 2012 in U.S. Appl. No. 12/816,804, filed Aug. 27, 2012.

U.S. Appl. No. 13/659,863, entitled System and Method for a Healthcare Monitoring Framework in a Network Environment, Inventors, Vasu Rangadass, et al., filed Oct. 24, 2012.

U.S. Appl. No. 13/753,092 entitled System and Method for Visualizing Patient Treatment History in a Network Environment, Inventors Gregory J. Poe, et al. filed Jan. 29, 2013.

Final Office Action in U.S. Appl. No. 12/816,804 mailed on Mar. 27, 2013.

U.S. Appl. No. 13/773,503 entitled System and Method for Visualizing Patient Treatment Measures in a Network Environment, Inventors Robert W. Beardall, et al. filed Feb. 21, 2013.

"The Discipline of Service Line Management," ACCELERO Health Partners, May 2009, available online at URL: <www.healthleadersmedia.com/content/232619.pdf>.

Clifford, Jim, et al., "Clinical Decision Support in the Medial Home, an Overview," Patient-Centered Primary Care Collaborative, 2010, available online at URL <www.pcpcc.net>.

Heatherington, Victoria, "The Dashboard Demystified: What is a Dashboard?", Dashboard Insight, Sep. 23, 2009, available online at URL: <http://www.dashboardinsight.com/articles/digital-dashboards/fundamentals/the-dashboard-demystified.aspx>.

Biga, et al. "Developing and Managing a Successful CV Service Line, an ACC Council on Clinical Practice White Paper," American College of Cardiology, E1249 (2012).

Request for Continued Examination and Amendment in U.S. Appl. No. 12/816,804, filed May 10, 2013.

Non-Final Office Action in U.S. Appl. No. 12/816,804 mailed on Sep. 26, 2013.

U.S. Appl. No. 13/943,769 entitled System and Method for Sharing Data in a Clinical Network Environment, Inventor(s) Ravi Seshadri et al., filed Jul. 16, 2013.

U.S. Appl. No. 61/728,463 entitled System to Improve Clinical Flow and Optimize Operational Efficiencies in Hospitals, inventor Vasu Rangadass, filed Nov. 20, 2012.

U.S. Appl. No. 13/943,706 entitled System and Method for Optimizing Clinical Flow and Operational Efficiencies in a Network Environment, inventor Vasu Rangadass, filed Jul. 16, 2013.

U.S. Appl. No. 13/945,738 entitled System and Method for Optimizing Clinical Flow and Operational Efficiencies in a Network Environment, inventor Vasu Rangadass, filed Jul. 18, 2013.

U.S. Appl. No. 13/945,853 entitled "System and Method for Optimizing Clinical Flow and Operational Efficiencies in a Network Environment", inventor Vasu Rangadass, et al., filed Jul. 18, 2013.

* cited by examiner

OPERATING SYSTEM

CROSS-REFERENCE TO RELATED APPLICATIONS

Applicant claims priority based on provisional application Ser. No. 61/086,344 filed on Aug. 5, 2008, the entire content of which are incorporated herein by reference

BRIEF DESCRIPTION OF THE FIGURES

For a more complete understanding of the present invention, including its features and advantages, reference is now made to the detailed description of the invention taken in conjunction with the accompanying drawing in which.

DETAILED DESCRIPTION OF THE INVENTION

Figure 1:
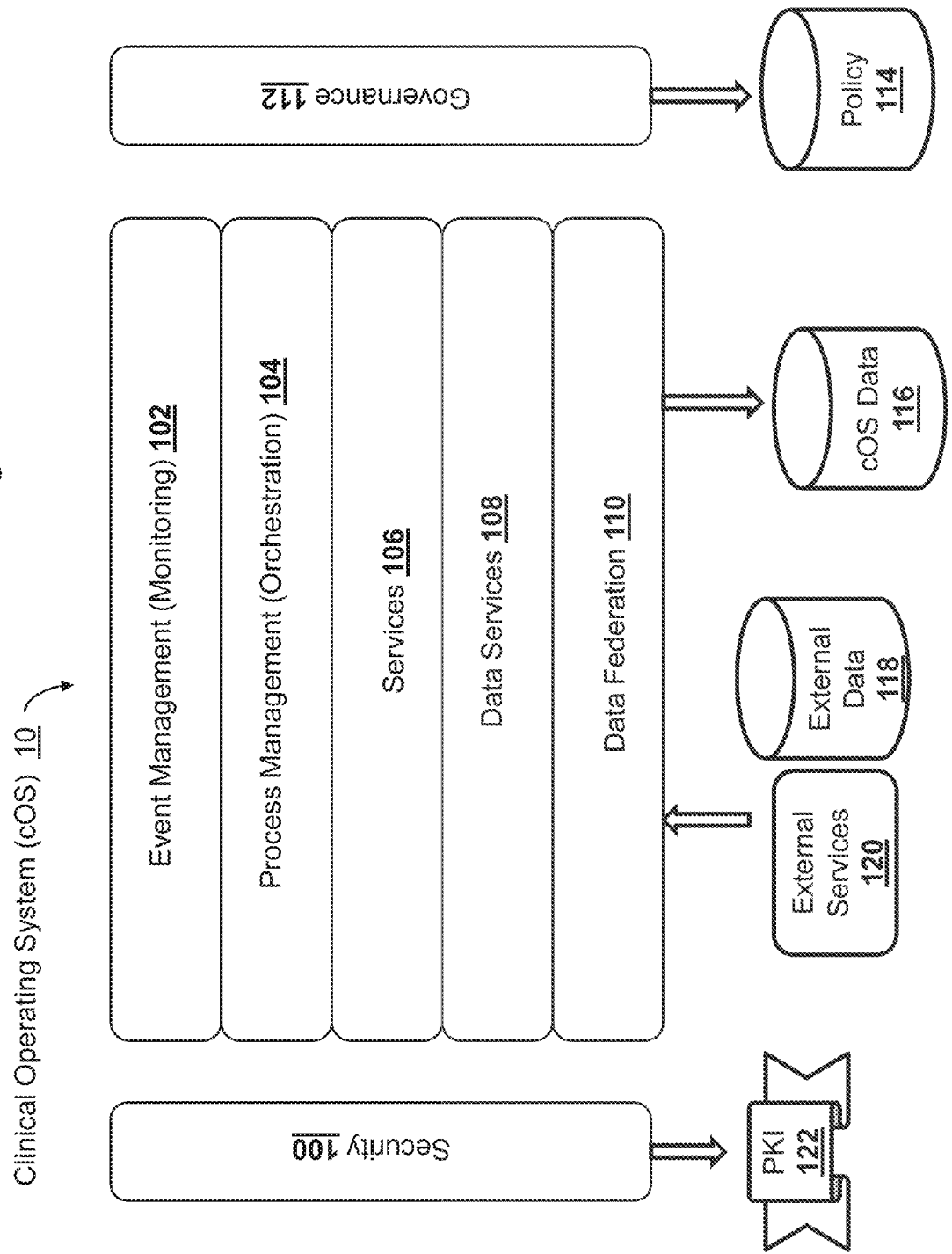
FIG. 1 is a block diagram illustrating an embodiment of a Clinical Operating System (cOS) comprising one embodiment of the present invention.

While the making and using of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not delimit the scope of the invention.

One of the most significant information technology challenges facing larger organizations today is determining how to address evolution of the application architecture. This challenge applies both to those that selected integrated enterprise applications in the expectation they would cover the full functionality required and would be readily upgradeable over time, and those who have gone for integration of "best of breed".

Purchasers of enterprise applications have found that upgrading an entire applications suite is a major, costly, and disruptive project and therefore avoided unless absolutely necessary. Consequently, best of breed and other point solutions appear to address urgent needs and require integration with the enterprise application for a lower initial cost than an entire applications suite upgrade. Meanwhile, those who purchased best of breed solutions initially find the complexity of application integration increasing. While in most cases, integration middleware is used rather than the hand-crafted interfaces used historically, mapping is still necessarily focused on individual applications and with complex changes needed for changed applications.

For these reasons, a number of the major enterprise application vendors have recognized the need to adopt a component approach to their applications, allowing the connectivity to work in such a way that organizations can upgrade individual components, rather than the whole applications suite. Their approach to this has generally been to adopt a service-orientated architecture based on web services. In parallel, application integration architects have been considering similar approaches to reduce integration complexity. In the healthcare sector where there is a wide range of clinical support systems, integration challenges are magnified despite the positioning of some major vendors as "the" answer.

A major opportunity for healthcare application integration is that health informatics is substantially standards-based. Although service orientated architectures have their own complexities, they too are based on standards. The goal therefore is to develop a standards-based set of services that, together with an integration orchestration, allow applications to collaborate in an ecosystem based solely on the nature of events being described, without having to be aware of the nature of the applications using those services.

The present invention addresses the foregoing and other difficulties which have long since been associated with the prior art of operating systems needing application integration and upgrades due to evolving application architectures. In accordance with the broader aspects of the invention, one embodiment of the invention comprises a clinical operating system comprising a series of self-contained interconnected modules and service layers for connecting proprietary systems together and extracting and translating data therefrom enabling existing software systems to operate and cooperate in an existing software ecosystem while allowing flexible connections with both existing and new applications. The clinical operating system (cOS) may utilize existing middleware tools for participation with the ecosystem or may utilize cOS adapter framework comprising one element of the present invention. An organization utilizing the clinical operating system may therefore access their computer ecosystem and build new applications without any re-write required to proprietary systems regardless of any changes to external systems and devices.

The clinical operation system is based upon a service-oriented architecture approach with a type-based system utilizing the modern principles of application abstraction. Systems connected with the cOS are preferably "Plug and Play" such that they can supply or use data in schema-compliant form through adapters. The cOS may therefore provide interface between a consumer and a provider comprising messages representing clinical events rather than data items. The cOS further translates messages such that all service layers and modules within the cOS may receive data and manipulate the received data for further action as necessary. The cOS enables consumers and providers to communicate with each other's systems with requiring any parties to upgrade or update their existing computer ecosystems due to a change in either internal or external systems software. The cOS maps data in accordance with standards-based extensible markup language (XML) schemas appropriate for whatever clinical or administrative events are supported by the cOS. A cOS Data model may be utilized for consolidation of clinical information into a clinical data repository (CDL).

For example, a cardiology practice may utilize different types of equipment from various manufacturers such as imaging systems and electromechanical devices and systems, each requiring its own proprietary software. The practice must therefore update and upgrade their computing ecosystem if changing or upgrading equipment. Further, if needed or applicable, the practice may need to interface with other care providers such as hospitals, other physicians, laboratories, or equipment manufacturer systems. The clinical operating system comprising the present invention enables the cardiology practice to communicate and interface with other care providers and all equipment software systems without updates or upgrades. The clinical operating system extracts data from the proprietary and external systems and translates the data for universal access. The system utilizes device drivers such as an adapter module for each individual proprietary system which reads and translates the data for further manipulation thereafter. The clinical operating system further enables the cardiology practice to build new applications and make other changes and upgrades independent of any changes to proprietary and external systems.

cOS—Technology Meta Model

The clinical operating system comprising the present invention is a service-oriented architecture (SOA) platform and therefore builds on the principles of an SOA MetaModel. The Clinical Operating System (cOS) comprises a series of self-contained, loosely-coupled service layers which provide functionality within the cOS. The components within each service layer expose and consume typed information. The service layers and modules may comprise at least the following: a routing services layer, a configuration services layer, an applications services layer, a cOS administration services layer, a data administration layer, a cOS administration portal, an administration portal, an infrastructure services layer; a services module, and a message management services layer.

Referring now to FIG. 1, there is shown a Clinical Operating System 10 comprising one embodiment of the present invention. The operating system 10 comprises an Event Management/Monitoring module 102 coupled with a Process Management/Workflow module 104, which, couples to a Services module 106. The Service module 106 couples with a Data Services module 108 coupled with a Data Federation module 110. The Data Federation module 110 inputs into a cOS Data database 116. An External Data database 118 inputs into the Data Federation module 110 through an External Services module 120. A Security module 100 encrypts utilizing a PKI standard 122 while a Governance module 112 gets policy requirements from a Policy database 114.

The Event Management/Monitoring module 102 comprises a routing services layer which provides services associated with processing of routing requests to service providers, including routing, logging, and monitoring of messages. The Process Management/Workflow module 104 comprises a configuration services layer having an extensible markup language (XML) based registry which stores data needed to support the system configuration, primarily a registry holding service provider information, pool data, message type, and schema information.

The Services module 106 comprises an application services layer comprises which contains specific information—information that typically in production implementations will be either supplied by third party using existing systems or will need to be extended to meet the requirements of a particular implementation. The application services layer may handle any security needs for all application services. The application services may include patient service providing an authoritative patient identifier and basic demographic information within the cOS; practitioner service providing an authoritative identifier of healthcare providers and basic demographic information within the cOS; consent service providing role-based privacy constraints on information available within the cOS, including HIPAA required constraints; clinical event service which provides an authoritative index of clinical event information which is available within the context of cOS, each service providing access to its data store by accepting typed messages routed thereto, utilizing a standard adapter that accepts, processes, and returns messages; and clinical operating system (cOS) administration services which is a set of data administration services which provide the ability to maintain data stored within each service layer.

The Data Services module 108 comprises a data administration services layer having a set of data administration services which provide the ability to maintain data stored within each services. Administration service components serve as a kind of "super adapter", which translates requests from the Administration Portal into message routing requests. Each service component provides the business logic to complete this translation as well as the functionality associated with validation of the maintenance operations from both a content and security perspective.

The Services module 106 may further comprise a cOS administration portal and a general administration portal, the cOS administration portal comprising a reference implementation of a browser-based user interface which provides user access to web service interface. The cOS administration portal, in association with the services layers, provides the ability for administrators of the COS to maintain the data held therein. The general administration portal comprises a reference implementation of a browser-based user interface which provides user access to the web service interfaces exposed by the cOS administration services layer. This portal, in association with the administration services layer, provides the ability for administrators to maintain the data held within the cOS.

The Security 100 and Governance 112 may comprise infrastructure services layers, which comprises a security envelope, exception management, logging and auditing services, and change management services. Security ensures that all messages interaction between the cOS services layer, service providers and message management services are completed by identified and authorized entities. This security is based on positive identification and authorization of adapters, either those exposed within the COS (by the COS Services or Other Services) or by a connected system within a particular service provider's systems. Any exceptions that are raised during the processing of connection messages between systems and services via the cOS routing service, are handled and logged by the adapters of those various systems and services The main goal of this service is to guarantee that changes within the system that would affect the operation of an adapter are notified to all affected adapters within a cOS-enabled solution. This allows the Adapters to invalidate all affected cache data, forcing a reload during the next operation.

The Event Management/Monitoring module 102 may comprise a message management service layer comprising a routing service for routing messages from an adapter implemented by a source to an adapter implanted by a sink and a monitoring service for logging of all messages submitted to the message management service layer.

Figure 2:
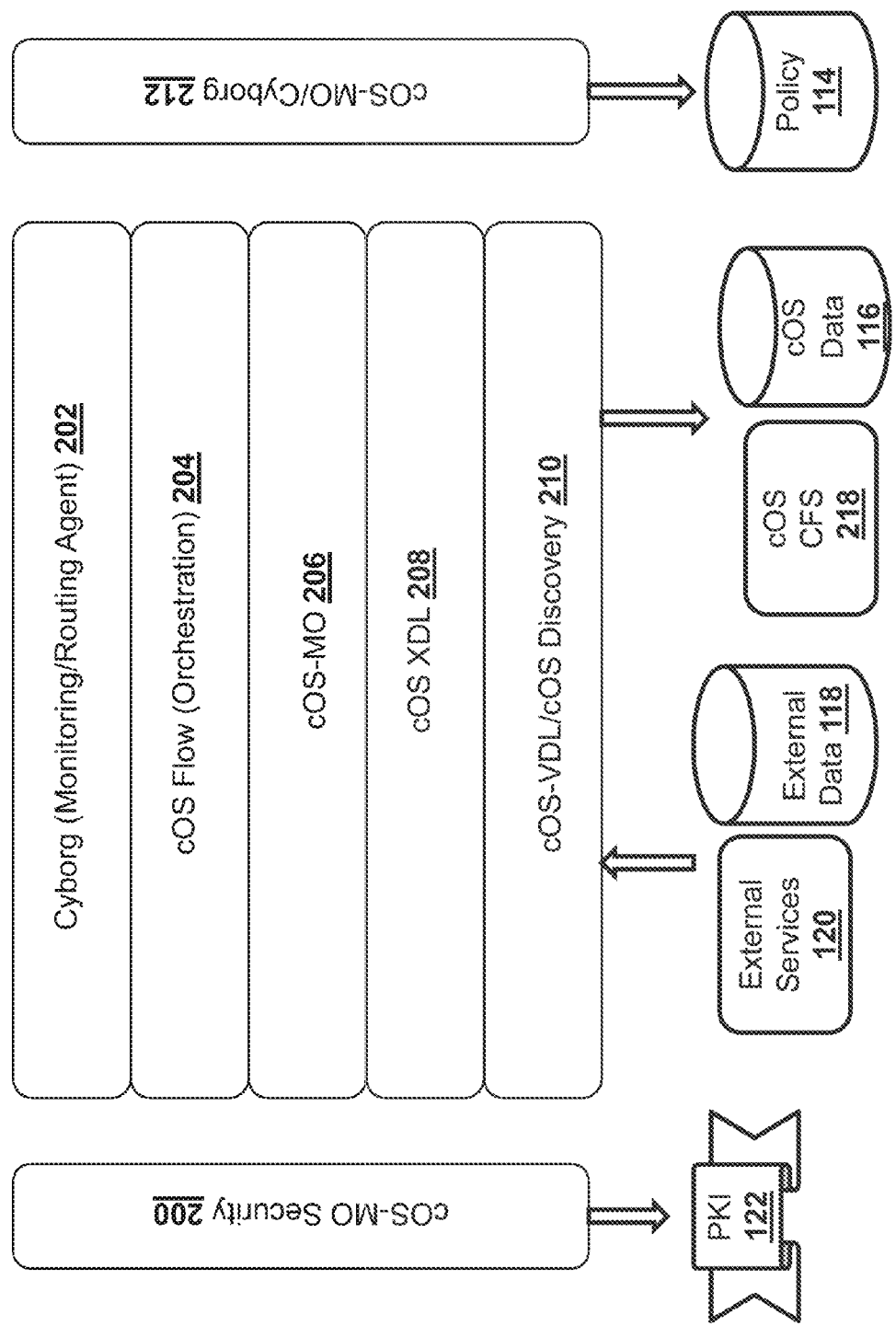
FIG. 2 is a block diagram illustrating a component architecture of a Clinical Operating System.

Now referring to FIG. 2, there is shown another embodiment of a clinical operating system one embodiment 20 comprising the following component architecture: a NeuralNet (Monitoring/Routing Agent) module 202 connected to a cOS Workflow (Orchestration) module 204, which, in turn connects to a cOS Message Organ module 206 (cOS MO). The cOS MO module 206 connects to a cOS XDL (XML data access layer) module 208, which exchanges data in an XML format between a supplier and a consumer, irrespective of the form of output by the supplier and without any additional payload. The cOS XDL module 208 connects to a cOS-virtual data layer (VDL)/cOS Discovery module 210 which inputs into a cOS Data database 116 and a cOS CFS module 218. Further, an External Data database 118 inputs into the cOS-VDL/cOS Discovery module 210 through an External Services module 120. Additionally, a cOS-MO Security module 200 encrypts utilizing a PKI standard 122 while a cOS-MO module 212 gets policy requirements from a Policy database 114.

Figure 4:
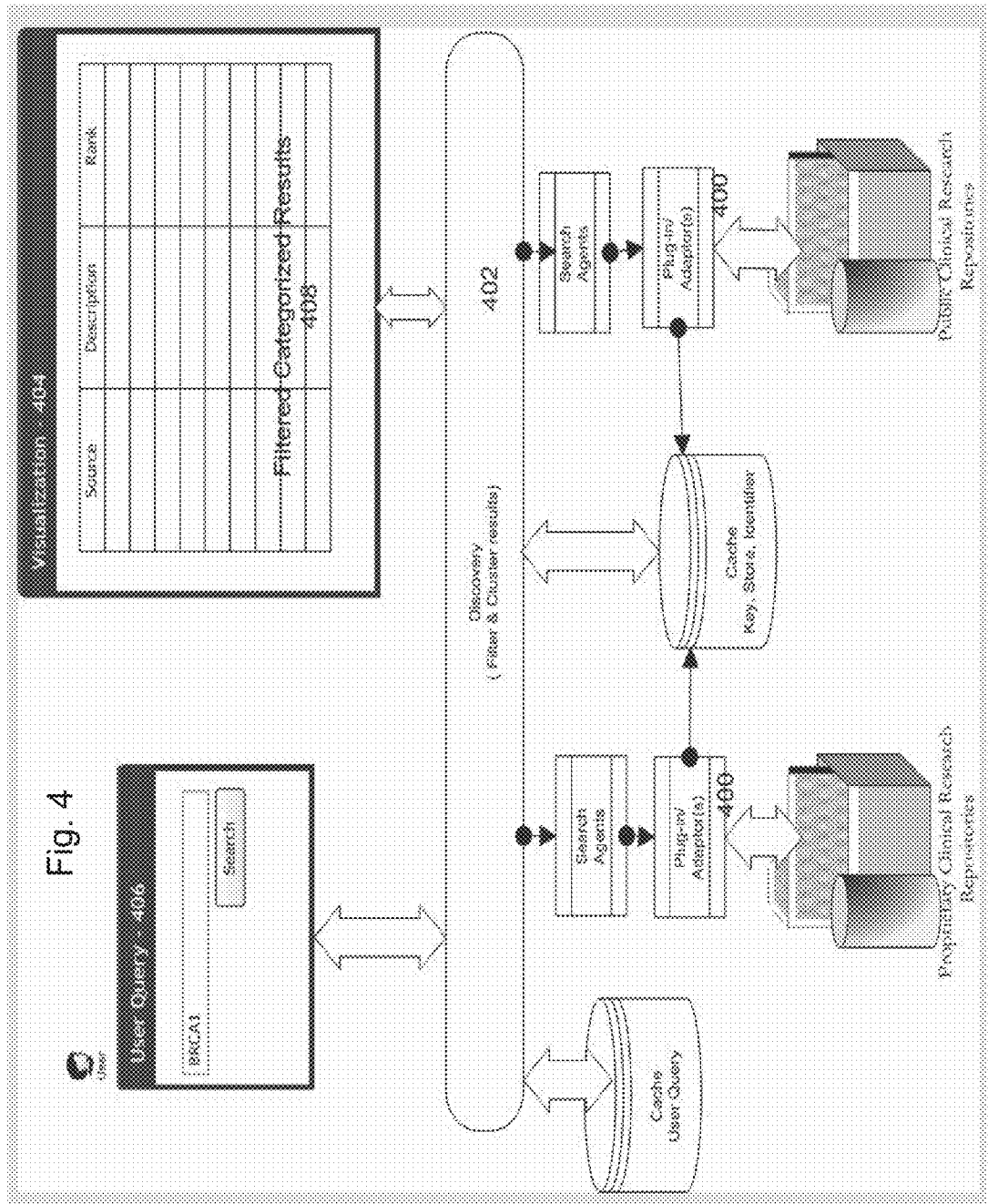
FIG. 4 is a block diagram illustrating cOS Discovery.

Now referring to FIG. 4 there is shown an embodiment of a discovery process performed by the discovery module 210 comprising one layer within the cOS of the present invention. Discovery is a federated search engine leveraging metadata from semantic networks (information sources) to disambiguate search queries to provide relevant results. Discovery also includes clustering mechanisms partitioning data into subsets that share common traits. Discovery also acts as a content aggregation engine where content across multiple semantic networks can be crawled simultaneously. The discovery process comprises a user query 406 invoking plug-in actions and/or crawler actions 400. The discovery process then filters and clusters the result 402 of the actions 400. Next, a visualization operation 404 causes a display of the filtered categorized results 408.

Referring again to FIG. 2, the cOS messaging organ (cOS-MO) 206 is an entry point for services into the cOS 20. The cOS-MO 206 is both federated, meaning the application and the cOS both exert control over which service the user receives, and independent whereby small cOS-MO agents are used as adaptors, "cos-motizing" other software into the cOS. The cOS-MO 206 is a core services framework for the cOS. With built-in load-balancing functionality, cOS-MO 206 services can be configured for optimal performance. The cOS-MO 206 supports failure analysis and configured for different levels of auditing/analysis. A non-cOS service can be cOS-motized by using cOS-MO agents as adaptors for external systems. Technical features include End-to-End Security, Agents and Clients, Rapid Prototyping, Adaptor Framework, High Availability Environment, and Living Network/Metrics.

The cOS flow 204 is a business process engine and a component framework for orchestrating simple workflow scenarios by utilizing built-in activity types. The cOS Workflow 204 also supports process analysis by tracking performance and cost measures of the activities in a given workflow context. Technical features include inherent multiple instance control, Event driven, OLAP based multi-dimensional process analysis, Cube with Process/Activity/Instance dimension, includes OLAP Server and Pivoting Client.

The cOS comprises a rules engine that executes XML vocabulary based conditions having two sets of objects: "Assumptions and Actions." A rule-execution set is passed to the rule-engine via an XML file. Assumptions have the format "leftTerm" ["operator" "rightTerm"]. Actions define the method requiring execution based on the assumptions. The cOS Rules are based on JSR-94, a java standard for rule-engine written in Java.

The cOS comprises different types of Plug-ins. Monitoring plug-ins are utilities/services for communicating with clustered cOS-Partners (cOS to cOS). COS-Discovery plug-ins are search plug-ins for external systems that have structured content and support query mechanisms. Examples that may be implemented are Pubmed and Wiki Plug-ins. COS-Discovery crawlers are search crawlers that are used to parse sources for content from a repository. Results from the crawlers are indexed using cOS Discovery indexing mechanisms. Crawlers such as ClinicalTrials.gov, TrialCheck, and Centerwatch.gov may be implemented. Word document crawlers and transactional data crawlers may also be implemented.

Analogous to machine operating systems, the cOS 20 comprises a File System 218—the cOS Clinical File System (CFS) 218, which comprises an electronic equivalent of a patient file folder. Traditional File Systems, store data (files) in the same format as they exist enabling quick search to retrieve. COS CFS stores the data in the same format and also normalizes the data into other convenient format facilitating different consumers to access it naturally. Normalizing the data enables cOS CFS agents to prepare the content in multiple formats (relational, graphical, text, analytical, voice, image etc) such that the data may be accessed on any machine regardless of the machine's operating system. The cOS CFS 218 has a portable component, a self-contained clinical file executable (CFX). In order for the CFS to be portable, privacy of the patient's health information must be safeguarded, therefore, the CFX contains only the data relevant to what a health care provider is treating utilizing the CFX rather than the patient's entire health record. Further, the CFX contains access rules associated to the relevant data and a challenge mechanism to read/write content and self-destructing scheme after an expiry period.

Figure 5:
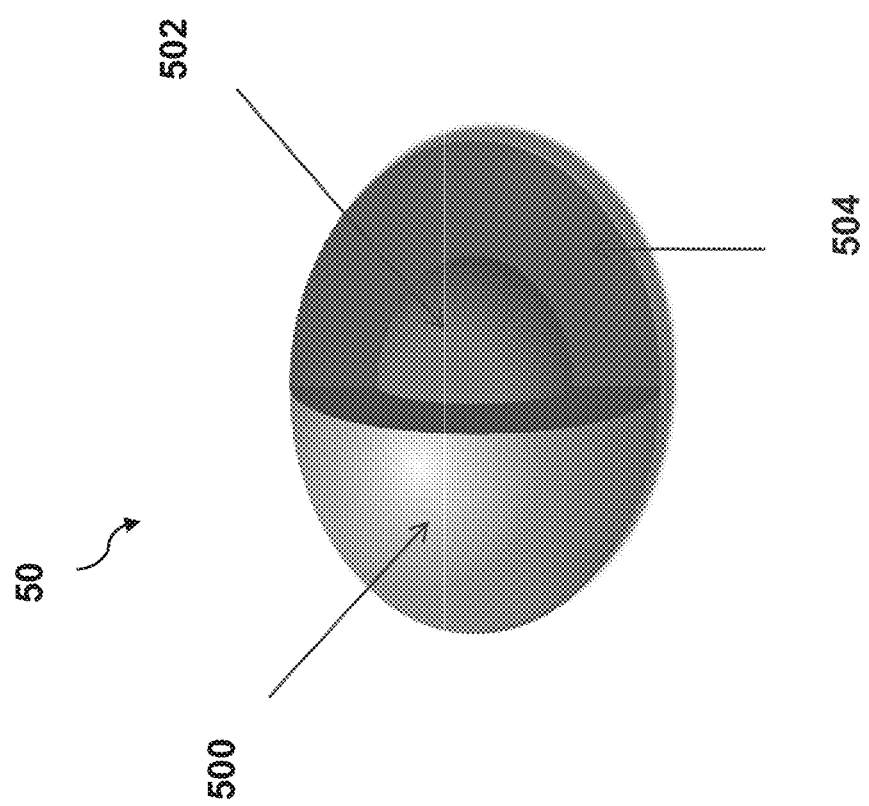
FIG. 5 is a conceptual model of cOS CFS.

Referring now to FIG. 5 there is shown a conceptual model of a cOS CFS 50. Each CFS comprises a protective shell 500, metadata 504, and a yolk 502. The protective shell 500 is encrypted, including a small executable program class. A user would double click on it to run locally. Other features include no access without appropriate credentials and no modification without logging to the metadata files 504. The shell 500 provides a chain of evidence to track data to its source. The CFS is designed with the a goal of achieving standalone compliance to 21 CFR Part 11 requirements whereby the CFS is protected in the event of a stolen portable device or laptop and can be safely emailed. The metadata 504 includes information about or extracted from documents. The extracted information can be used to populate new electronic forms or databases. The yolk 502 includes original documents stored within the egg that may be individually accessible.

Figure 3:
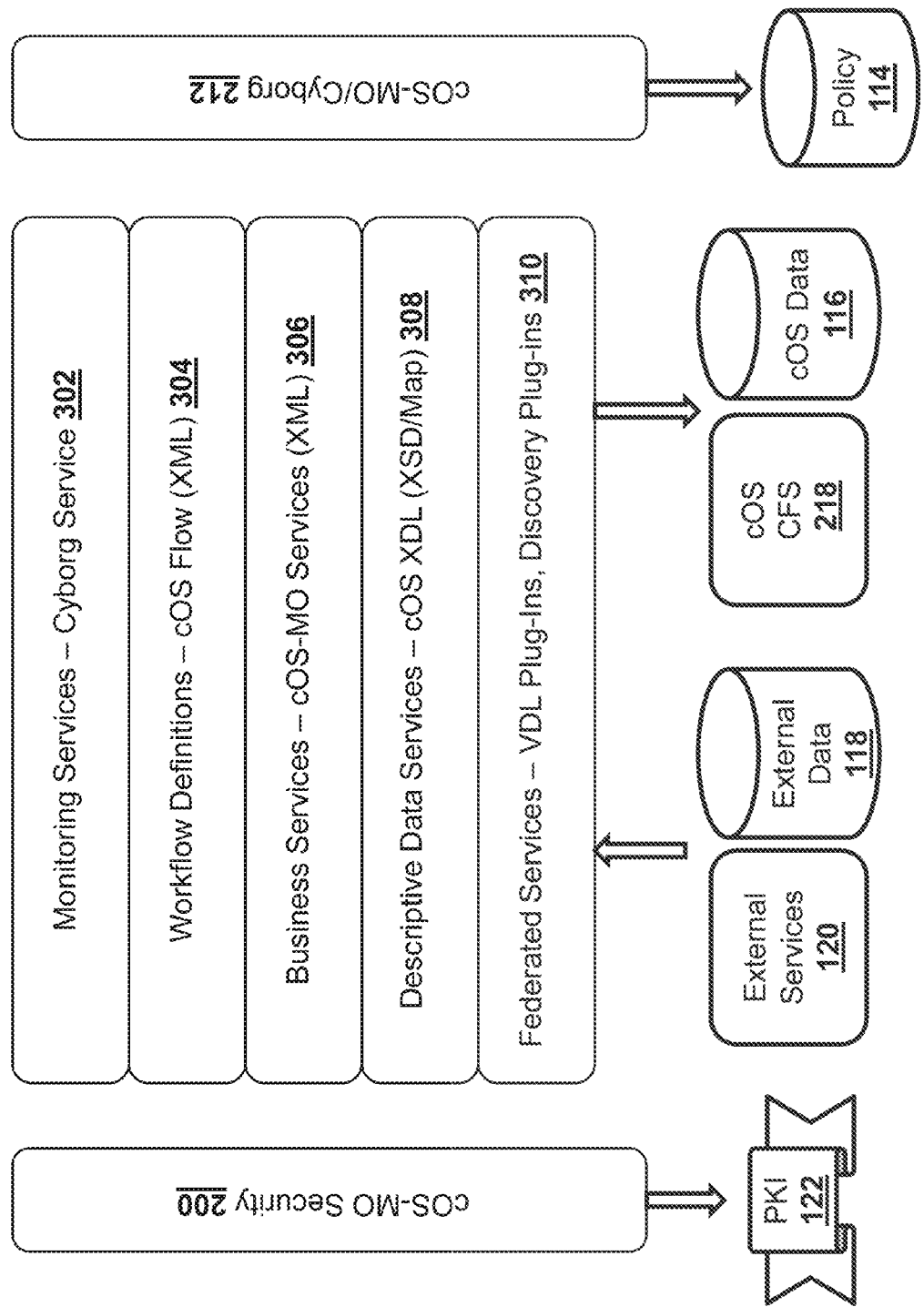
FIG. 3 is a block diagram illustrating service layers of the cOS shown in FIG. 1.

Now referring to FIG. 3, there is shown an embodiment of service layers comprising a clinical operating system 30 comprising a monitoring services—NeuralNet service layer 302 connected to a Workflow Definitions—cOS Flow (XML) layer 304, which connects to a Business Services—cOS-MO Services (XML) layer 306. The Business Services—cOS-MO Services (XML) layer 306 connects to a Descriptive Data Services—cOS XDL (XSD/Map) layer 308, which, in turn, connects to a Federated Services—VDL Plug-Ins, Discovery Plug-ins layer 310. The Federated Services—VDL Plug-Ins, Discovery Plug-ins layer 310 inputs into a cOS Data database 116 and a cOS CFS module 218. An External Data database 118 inputs into the Federated Services—VDL Plug-Ins, Discovery Plug-ins layer 310 through an External Services module 120 while a cOS-MO Security module 200 encrypts utilizing a PKI standard 122 while a cOS-MO/NeuralNet module 212 gets policy requirements from a Policy database 114.

COS—Virtual Data Layer

Figure 6:
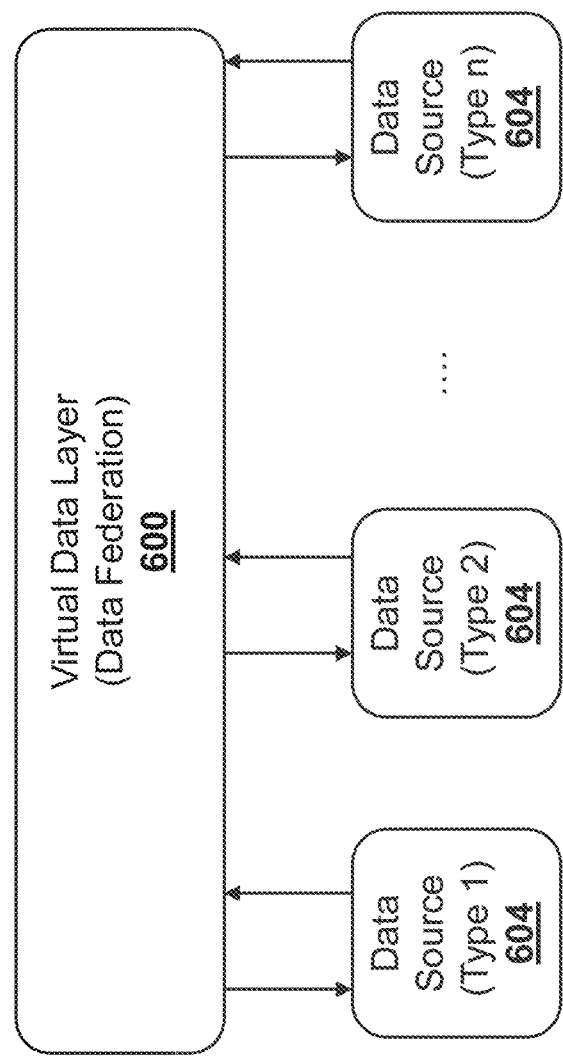
FIG. 6 is a block diagram depicting a virtual data layer.

Analogous to machine operating systems, the cOS of the present invention abstracts complexities of down-stream communication. Like machine operating system abstracting hardware (e.g. HAL layer in windows), cOS uses Virtual Data Layer (VDL) to abstract data flow from up-stream consumers. Now, referring to FIG. 6, there is shown one embodiment of a VDL 600 which may comprise the cOS. The VDL 600 serves as a data federation service in the cOS stack in order to abstract data federation through a simple, schema-based service invocation framework. The VDL 600 facilitates communication to down-stream sources (applications, databases, services, hardware) using a variety of protocols. The VDL 600 has multiple types of data sources 604. The value of a data federation layer is to provide true transparency of underlying heterogeneity.

XML Definition Language allows mapping of existing relational schemas to metadata types (XSD). In addition, data can be exchanged using metadata types and mapping constructs (XML Definitions) that map data-elements to relational schema tables/columns. Metadata types can be complex, mapping to more than one table for the data that needs to be persisted or retrieved. Pass-thru mappers may therefore be used for data exchange with XML systems (web services, xml files, etc). In addition to mapping, the VDL abstracts users from the underlying data-provider details.

Messages

All messages passed between Adapters within the cOS platform take the form of a Message. The Message provides the common XML-based document structure used for all messages where routing is coordinated by the Message Management Services/COSMO. Messages are produced by and consumed by native services or Adapters implemented by each Service Provider and by the internal services provided by the Administration Services.

Message Structure

Figure 7:
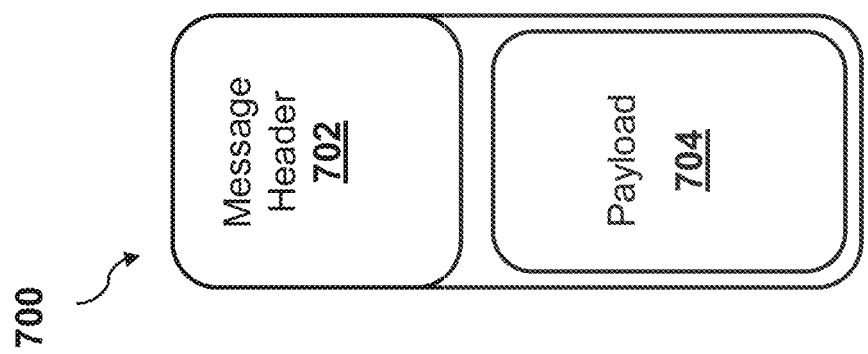
FIG. 7 depicts a structure of a message generated by a cOS.

Now referring to FIG. 7, there is shown an embodiment of a message 700 which may be generated by the cOS of the present invention. Each message 700 comprises a standard message header 702 and a payload 704. Items within the message header 702 identify parameters such as a unique identifier allowing separate messages to be related; the system sending the message; the type of the message; and the message status code and description. The elements within the header 702 are not encrypted and are available for interrogation and modification by the message management services and adapters during the routing process.

The payload 704 comprises a message body and associated message type. The payload 704 conforms to the schema defined for each message type held within the service provider register. Optionally, the payload 704 of each message can be encrypted by the source and can only be decrypted by the destination Service. The body contains this encrypted payload along with the details needed to decrypt the payload, such as the type of encryption used.

Message Management Services—COSMO

Figure 8:
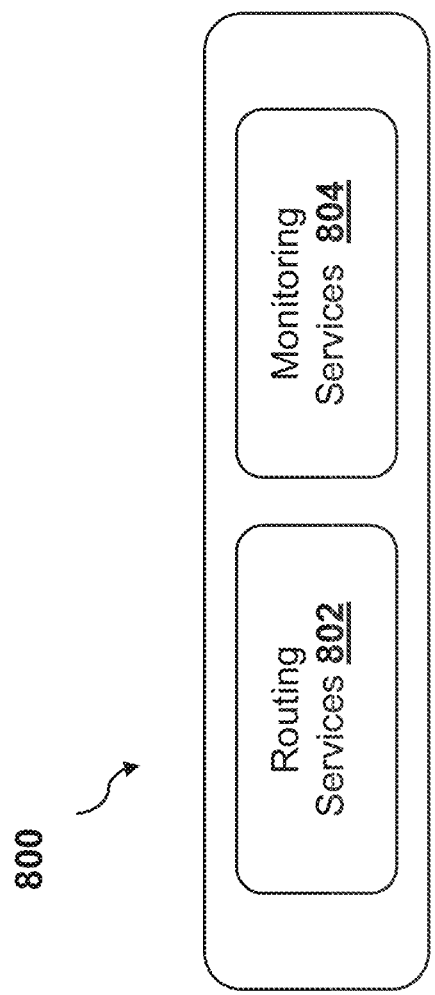
FIG. 8 is a block diagram illustrating a message management services comprising the cOS shown in FIG. 1.

The message management services layer comprising the clinical operating system provide a series of services associated with the processing of routing requests in a solution enabled by cOS. Services provided by this layer include routing, logging and monitoring of all messages. Now referring to FIG. 8 there is shown a message management services layer 800 similar to Event Management/Monitoring module 102 comprising routing services 802 and monitoring services 804. The routing service 802 provides routing of messages from an adapter implemented by a source to an adapter implemented by a sink. Validation of each routing request is completed to ensure that source is allowed to send the message (defined by the message type) to the sink. The monitoring service 804 provides logging of all messages submitted to the message management services. The monitoring service 804 logs all elements within each message header and functionality is provided to view logged information for monitoring and auditing purposes. All interactions with the monitoring service 804 must be loosely coupled with other services within cOS. Messages are passed into and modified within orchestrations and returned by the service 804. Components within the message management service layer should 800 be implemented in a modular manner, allowing the functionality provided by the service 804 to be extended with the minimal impact on other components, both within the message management service layer 800 and within other service layer and modules comprising the cOS. All interaction is synchronous, end-to-end from a source service provider to a destination service provider. The routing service only uses the header information within each message. The payload is considered "opaque" to the service as it may be encrypted with the destination service provider's public key and can only be decrypted using the destination service provider's private key.

Implementation Overview

Figure 9:
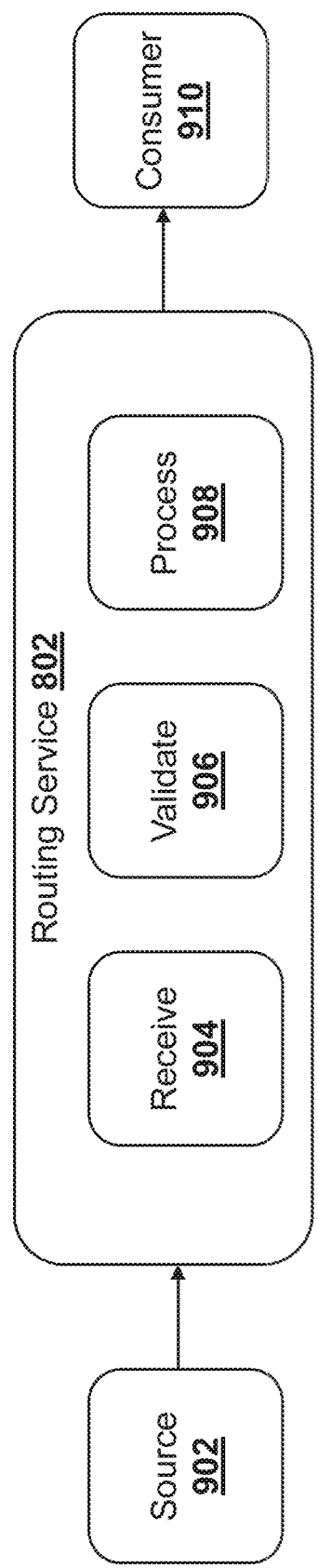
FIG. 9 is a block diagram illustrating the components of a routing service comprising the cOS shown in FIG. 1.

Now referring to FIG. 9, there is shown the routing services layer 802 of the message management module 800. The routing service layer 802 routes messages from an adapter implemented by a source. The Adapter associated with the source service submits a message and receives feedback about the status of that request. The Adapter associated with the destination service receives a validated message via its service interface. A service interface is invoked by a source 902 to route to a destination service; receive message module 904 accepts the message; a validate message module 906 validates the type of the message to be sent after accepting the message; a process message module 909 forwards the message to the destination or consumer 910 if routing validation succeeds.

Document Transformation

Figure 10:
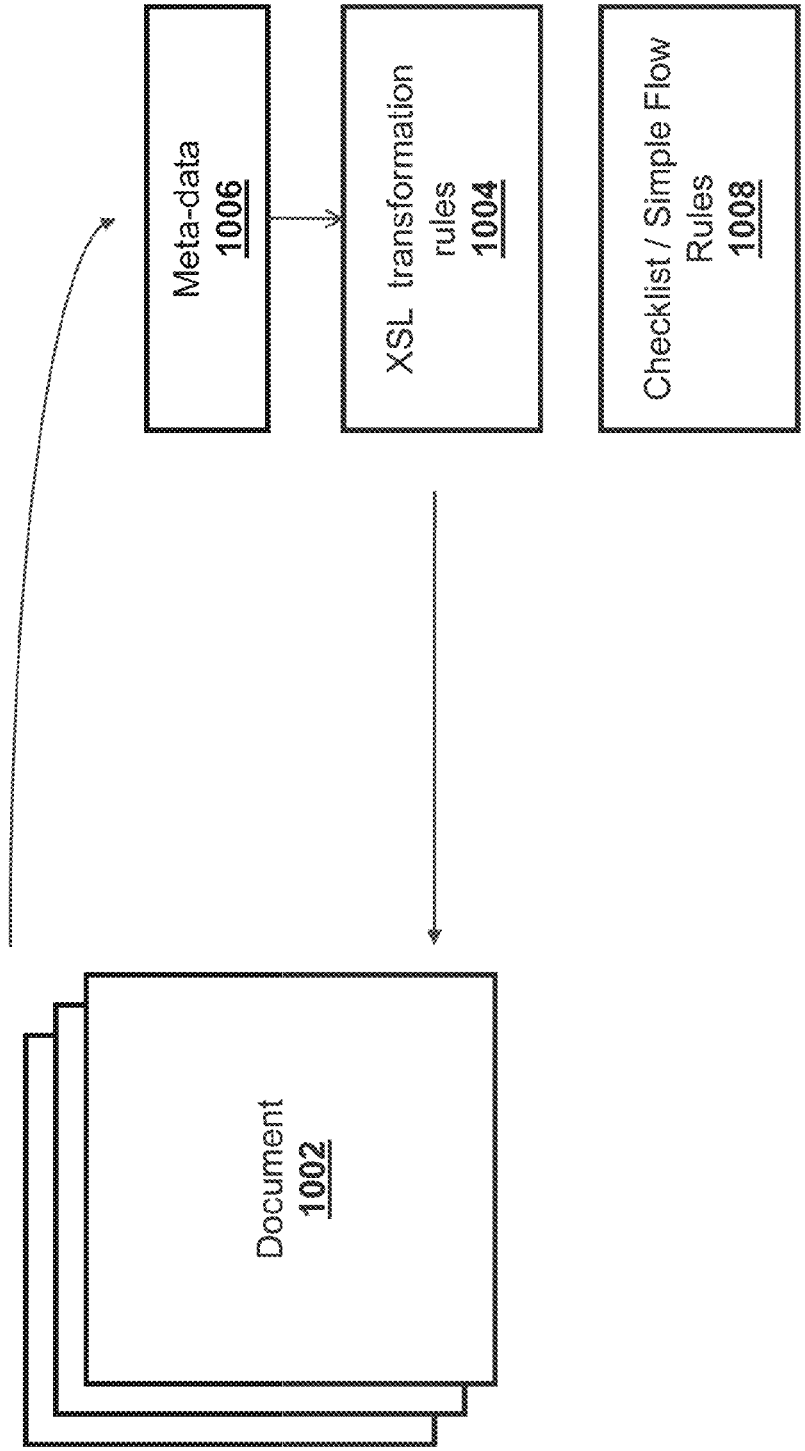
FIG. 10 is a block diagram illustrating document transformation.
Figure 11:
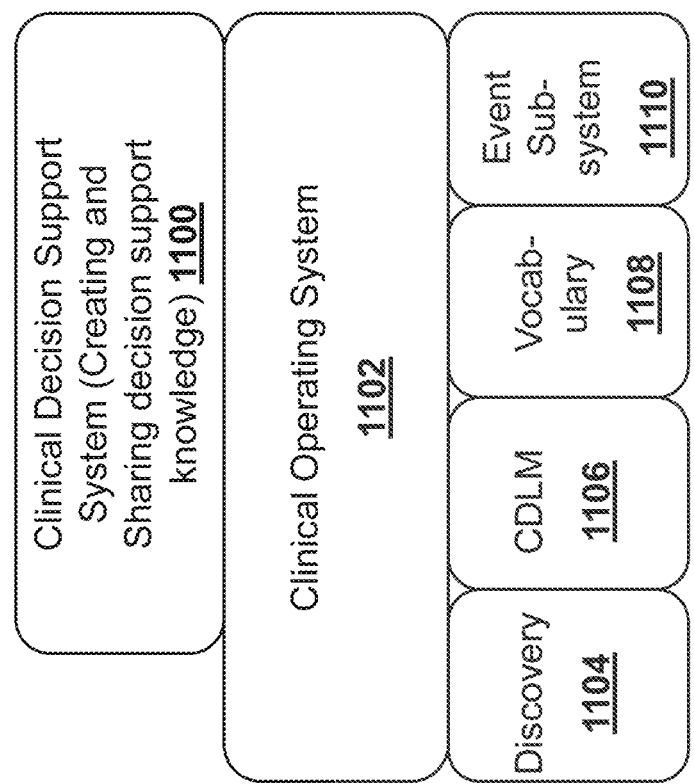
FIG. 11 is a block diagram illustrating cOS CDLM.

Now referring to FIG. 10, there is shown a transformer (Java component using XSL) 1000 which transforms a document 1002 to/from any valid XML file, to/from Microsoft word form in .docx, or to any text format, by applying XSL transformation rules 1004 to the meta-data 1006 using a checklist/simple flow rules 1008.

cOS Auditing Services cOS Auditing is an auditing framework for recording certain types of events across the healthcare application. All audit messages are XML encoded. Different types of audit-events that are supported, including authentication success/failures, patient record events, general access failures, and services failures/start-ups cOS Clinical Discovery Logic Module—a Specialized cOS Service Referring now to FIG. 11 there is shown a clinical operating system 1102 which connects to a clinical decision support system 1100, which creates and shares decision support knowledge. In addition, a discovery repository 1104, a Clinical Discovery Logic Manager (CDLM) module 1106, a vocabulary repository 1108, and an event sub-system repository 1111 connect to the clinical operating system 1102. The CDLM module 1106 is a clinical logic library that defines how events and activities in a clinical situation can be applied to take clinical decisions for similar situations. CDLM publisher agents can publish knowledge events to knowledge base repositories/cOS Discovery. CDLM subscriber agents can subscribe knowledge tips from cOS Discovery/Knowledge repositories. CDLM provides a clinical decision support system that helps prevent significant medical errors, enables clinical research community with up-to-date information, and enables physician communities (subscribed to clinisite) access to best-practices for making clinical decision. CDLM also uses vocabulary services (future) and cOS Rules to generate a decision matrix for a given clinical situation.

The clinical operating system architecture described here may be utilized by various types of organizations or companies, including health care providers, law offices, banks, accounting offices, and various other organizations where client security is a concern and/or many systems are utilized within the organization that require connection and communication both with other systems within the organization and systems external to the organization, such as laboratories, pharmacies, equipment manufacturers (as in the case of health care providers), other financial institutions, court communication systems, and various other external organizations which may provide services or information to an organization.

For example, a health care provider may utilize a treatment program that takes into account the patient's health signature, wherein the health care signature comprises vital signs, medical history and other health information. The health care signature may require many times a second, or an increment of minutes, hours, days, weeks and/or months. A clinical operating system for the healthcare providers may comprise a Voice over Internet Protocol (VoIP) module that the health care provider initiates, wherein the module calls a health care giver and a second person and connects the doctor and patient on the call while displaying the health care signature of a patient on a computer display. The second person may be a patient, another doctor, or health care giver.

The architecture of the clinical operating system described herein may be implemented on a web server, wherein the web service may be located internally to an organization utilizing the clinical operating system, or may be located at a remote location.

The architecture of may be implemented on a computer that a health care provider can buy whereby the system is "within one box" wherein the health care provider can start using it as soon as it is initiated.

The clinical operating system may be configures with a closed loop management system for a variety of diseases, comprising executing the treatment program, evaluating patient to determine performance of the treatment program, re-evaluating the patient's health signature, save performance of treatment program and health signatures in an outcomes data-warehouse, and re-evaluate treatment program according to patient's response and change if necessary. The outcomes data-warehouse may be used to suggest treatment programs for similar situations with the same or similar diseases.

Although this invention has been described with reference to an illustrative embodiment, this description is not intended to limit the scope of the invention. Various modifications and combinations of the illustrative embodiments as well as other embodiments of the invention will be apparent to persons skilled in the art upon reference to the description. It is therefore intended that the appended claims accomplish any such modifications or embodiments.

We claim:

1. A clinical operating system architecture implemented on a web server comprising:
    an event management services module;
    a process management module connected with the event management module;
    a services module connected with the process management module, wherein the services module handles security needs for all application services, wherein the application services comprise patient services, practitioner services and clinical event services, wherein the patient services provide authoritative patient identifiers and corresponding basic demographic information within the operating system, wherein the practitioner services provide authoritative identifiers of healthcare providers and corresponding basic demographic information within the operating system, wherein the clinical event services provide an authoritative index of clinical event information available within a context of the operating system;
    a data services module connected with the services module;
    a data federation module connected with the data services module;
    a security module; and
    a governance module;
    wherein each module comprises self-contained service layers coupled together and all modules are interconnected and communicate therebetween;
    wherein the data federation module inputs into an operating system database through a schema based invocation framework such that the operating system is configured to extract data from proprietary and external systems and translate the data for universal access, wherein the data federation module includes adaptors that read the data and translate the data, wherein the data is converted to one or more messages, wherein each message comprises a payload and a header in an XML-based document structure, wherein the translating the data includes applying transformation rules to metadata using a checklist, wherein the data federation module maps data elements to relational schema tables and abstracts users from underlying data provider details, wherein the data federation module communicates with down-stream data sources using a variety of protocols, wherein the data sources include applications, databases, services and hardware;
    wherein an external database inputs into the data federation module through an external services module; and
    wherein the security module encrypts utilizing a PKI standard and wherein the governance module gets policy requirements from a policy database.

2. The clinical operating system according to claim 1 wherein the event management services modules comprises a routing services layer which provides services associated with processing of routing requests to service providers, including routing, logging, and monitoring of messages.

3. The clinical operating system according to claim 1 wherein the process management module comprises a configuration services layer having an extensible markup language based registry which stores data needed to support the system configuration.

4. The clinical operating system according to claim 1 wherein the services module comprises an application services layer which contains specific information necessary to meet implementation requirements for systems incorporated into the clinical operating system.

5. The clinical operating system according to claim 1 wherein the services module further comprises an operating system administration portal and a general administration portal, wherein the operating system administration portal comprises a reference implementation of a browser-based user interface which provides user access to web service interface.

6. The clinical operating system according to claim 1 wherein each service provides access to its data store by accepting typed messages routed thereto, utilizing a standard adapter that accepts, processes, and returns messages.

7. The clinical operating system according to claim 1 wherein the services module comprises a cOS administration portal and a general administration portal, wherein the cOS administration portal comprises a reference implementation of a browser-based user interface, which provides user access to a web service interface.

8. The clinical operating system according to claim 1 wherein the data services module comprises a data administration services layer having a set of data administration services which provide the ability to maintain data stored within each services.

9. The clinical operating system according to claim 1 wherein the security module comprises infrastructure services layers, the infrastructure services layers comprising a security envelope, exception management, logging and auditing services, and change management services.

10. The clinical operating system according to claim 1 wherein the governance module comprises infrastructure services layers, the infrastructure services layers comprising a security envelope, exception management, logging and auditing services, and change management services.

11. The clinical operating system according to claim 1 wherein a message generated by the operating system comprises a message header and a payload, the payload comprising a message body and an associated message type.

12. The clinical operating system according to claim 1 wherein the operating system connects with a clinical decision support system for providing a user of the operating system with best practices and updated clinical research and results information, the support system comprising a discovery repository, a clinical discovery logic manager module, a vocabulary repository, and an event sub-system repository.

13. A clinical operating system architecture implemented on a web server comprising:
a services module connected with a process management module, wherein the services module handles security needs for all application services, wherein the application services comprise patient services, practitioner services and clinical event services, wherein the patient services provide authoritative patient identifiers and corresponding basic demographic information within the operating system, wherein the practitioner services provide authoritative identifiers of healthcare providers and corresponding basic demographic information within the operating system, wherein the clinical event services provide an authoritative index of clinical event information available within a context of the operating system;
a monitoring and routing module;
an operating system workflow module connected with the monitoring and routing module;
a message organ module connected with the operating system workflow module;
an external data layer module connected with the message organ module;
a virtual data layer and discovery module which inputs into an operating system data database, the virtual data layer and discovery module connected with the external data layer;
wherein each module comprises self-contained service layers coupled together and all modules are interconnected and communicate therebetween;
wherein the virtual data layer abstracts data from up-stream consumers through a schema based invocation framework such that the operating system is configured to extract data from proprietary and external systems and translate the data for universal access, wherein the virtual data layer facilitates reading the data and translating the data, wherein the data is converted to one or more messages, wherein each message comprises a payload and a header in an XML-based document structure, wherein the translating the data includes applying transformation rules to metadata using a checklist, wherein the virtual data layer maps data elements to relational schema tables and abstracts users from underlying data provider details, wherein the virtual data layer communicates with down-stream data sources using a variety of protocols, wherein the data sources include applications, databases, services and hardware;
wherein an external database inputs into the virtual data layer and discovery module through an external services module; and
wherein the security module encrypts utilizing a PKI standard and
wherein the governance module gets policy requirements from a policy database.

14. The clinical operating system according to claim 13 further comprising a plurality of plug-ins.

15. The clinical operating system according to claim 13 further comprising a clinical file system for patient records, the file system comprising an encrypted protective shell; metadata; a yolk; and a self-contained clinical file executable comprising relevant content; associated access rules, and a challenge mechanism to read and write content and a self-destructing scheme after an expiry period.

16. The clinical operating system according to claim 13 wherein the virtual data layer and discovery module comprises a federated search engine leveraging metadata from semantic information sources to disambiguate search queries to provide relevant results; a clustering mechanism partitioning data into subsets that share common traits; a user query invoking plug-in actions and crawler actions; wherein the relevant results are thereafter filtered and clustered and thereafter displayed by a visualization operation.

17. The clinical operating system according to claim 13 wherein the security module comprises infrastructure services layers, the infrastructure services layers comprising a security envelope, exception management, logging and auditing services, and change management services.

18. The clinical operating system according to claim 13 wherein the governance module comprises infrastructure services layers, the infrastructure services layers comprising a security envelope, exception management, logging and auditing services, and change management services.

19. The clinical operating system according to claim 13 wherein a message generated by the operating system comprises a message header and a payload, the payload comprising a message body and an associated message type.

20. The clinical operating system according to claim 13 wherein the operating system connects with a clinical decision support system for providing a user of the operating system with best practices and updated clinical research and results information, the support system comprising a discovery repository, a clinical discovery logic manager module, a vocabulary repository, and an event sub-system repository.

* * * * *